United States Patent
Kim et al.

(10) Patent No.: US 9,250,370 B2
(45) Date of Patent: Feb. 2, 2016

(54) ADHESIVE COMPOSITION FOR POLARIZER PLATE, POLARIZER PLATE INCLUDING ADHESIVE LAYER INCLUDING THE SAME, AND OPTICAL DISPLAY INCLUDING THE SAME

(75) Inventors: Yi Eun Kim, Uiwang-si (KR); Woo Jin Jeong, Uiwang-si (KR); Hae Ryong Chung, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 198 days.

(21) Appl. No.: 13/613,070

(22) Filed: Sep. 13, 2012

(65) Prior Publication Data

US 2013/0165597 A1 Jun. 27, 2013

(30) Foreign Application Priority Data

Dec. 22, 2011 (KR) ........................ 10-2011-0140659

(51) Int. Cl.
| | |
|---|---|
| *C09J 133/00* | (2006.01) |
| *G02B 5/30* | (2006.01) |
| *G02B 5/20* | (2006.01) |
| *C09J 175/04* | (2006.01) |
| *C08G 18/62* | (2006.01) |
| *C08G 18/79* | (2006.01) |
| *C08G 18/80* | (2006.01) |

(52) U.S. Cl.
CPC ............ *G02B 5/305* (2013.01); *C08G 18/6229* (2013.01); *C08G 18/792* (2013.01); *C08G 18/8029* (2013.01); *C09J 133/00* (2013.01); *C09J 175/04* (2013.01); *G02B 5/20* (2013.01); *C08F 2810/20* (2013.01); *G02F 2202/28* (2013.01)

(58) Field of Classification Search
None
See application file for complete search history.

(56) References Cited

U.S. PATENT DOCUMENTS

| 2006/0057368 A1* | 3/2006 | Kobayashi et al. ............ 428/343 |
| 2012/0108734 A1* | 5/2012 | Ogawa et al. .................. 524/558 |

FOREIGN PATENT DOCUMENTS

| CN | 1749344 A | 3/2006 |
| JP | 2008-150544 A | 7/2008 |
| TW | 1386420 B1 | 2/2013 |

OTHER PUBLICATIONS

Duranate Data sheet (2014).*
Herbstman, Trimerization of Isocyanates by Trialkylantimony and -arsenic Oxides, J. Org. Chem., 1965, 30(4) pp. 1259-1260.*
Office Action mailed Apr. 23, 2014 in corresponding Korean Patent Application No. 10-2011-0140659.
Office Action mailed Oct. 13, 2014 in corresponding Taiwanese Patent Application No. 101132984.

* cited by examiner

*Primary Examiner* — Robert C Boyle
(74) *Attorney, Agent, or Firm* — Lee & Morse, P.C.

(57) ABSTRACT

An adhesive composition for a polarizer plate, the adhesive composition including a (meth)acrylic copolymer and a polyisocyanate curing agent containing an isocyanurate structure.

8 Claims, 1 Drawing Sheet

ADHESIVE COMPOSITION FOR POLARIZER PLATE, POLARIZER PLATE INCLUDING ADHESIVE LAYER INCLUDING THE SAME, AND OPTICAL DISPLAY INCLUDING THE SAME

CROSS-REFERENCE TO RELATED APPLICATION

This application claims priority under 35 U.S.C. §119 to Korean Patent Application No. 10-2011-0140659, filed on Dec. 22, 2011, in the Korean Intellectual Property Office, and entitled: "Adhesive Composition for Polarizer Plate, Polarizer Plate including Adhesive Layer including the Same, and Optical Display including the Same," the entire contents of which are hereby incorporated by reference for all purposes.

BACKGROUND

1. Field

Embodiments relate to an adhesive composition for a polarizer plate, a polarizer plate including an adhesive layer including the same, and an optical display including the same.

2. Description of the Related Art

Polarizer plates are placed on both sides of a liquid crystal cell to control oscillation of light in order to generate a display pattern of a liquid crystal display. Application ranges of liquid crystal displays have been continuously widened from small devices of an initial stage to notebook computers, liquid crystal monitors, liquid crystal color projectors, liquid crystal televisions, navigation systems for vehicles, personal phones, outdoor/indoor measurement instruments, and the like.

SUMMARY

Embodiments are directed to an adhesive composition for a polarizer plate, the adhesive composition including a (meth)acrylic copolymer, and a polyisocyanate curing agent containing an isocyanurate structure.

The polyisocyanate curing agent may be represented by Formula 1:

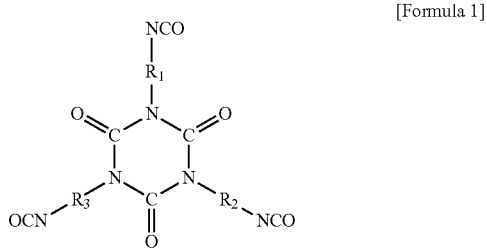

[Formula 1]

In Formula 1, $R_1$, $R_2$, and $R_3$ may each independently be a substituted or unsubstituted C1-C10 alkylene group, a substituted or unsubstituted C5-C10 cycloalkylene group, or a substituted or unsubstituted C6-C20 arylene group.

The polyisocyanate curing agent may be present in an amount of about 0.01 to about 5 parts by weight based on 100 parts by weight of the (meth)acrylic copolymer.

The adhesive composition may further include a second curing agent selected from the group of a non-isocyanurate isocyanate compound, a carbodiimide compound, an epoxy compound, an aziridine compound, a melamine compound, an amine compound, an imide compound, an amide compound, and mixtures thereof.

The second curing agent may be present in an amount of about 0.001 to about 5 parts by weight based on 100 parts by weight of the (meth)acrylic copolymer.

The polyisocyanate curing agent and the second curing agent may be present in a total amount of about 0.011 to about 2 parts by weight based on 100 parts by weight of the (meth)acrylic copolymer.

The adhesive composition may further include a silane coupling agent.

The silane coupling agent may be present in an amount of about 0.01 to about 5 parts by weight based on 100 parts by weight of the (meth)acrylic copolymer.

Embodiments are also directed to a polarizer plate including an adhesive layer formed of an adhesive composition according to an embodiment.

A difference of Y1-Y2 may range from about 300 μm to about 1500 μm, when Y1 represents a pushed distance of the adhesive layer measured at 70° C. by subjecting a sample to a load of 2250 gf for 1000 seconds, and Y2 represents a pushed distance of the adhesive layer measured at 25° C. by subjecting another sample to a load of 2250 gf for 1000 seconds, each of the samples being prepared by leaving the adhesive layer having a thickness of 20 μm at 35° C. and a relative humidity of 45% for 4 days to cure the adhesive layer, and cutting the cured adhesive layer into a 15 mm×15 mm piece, which in turn is attached to a glass substrate and left at 25° C. for 1 day.

Embodiments are also directed to an optical display including a polarizer plate according to an embodiment.

BRIEF DESCRIPTION OF DRAWINGS

Features will become apparent to those of skill in the art by describing in detail example embodiments with reference to the attached drawings in which.

DETAILED DESCRIPTION

Figure 1:
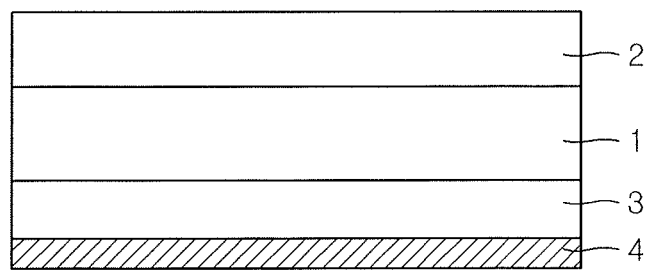
FIG. 1 illustrates an embodiment of the polarizer plate.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

In an embodiment, an adhesive composition for polarizer plates includes a (meth)acrylic copolymer (A) and a curing agent (B).

The curing agent may include a polyisocyanate curing agent (B1) containing an isocyanurate structure. The polyisocyanate curing agent containing an isocyanurate structure may include a plurality of isocyanate groups, for participating in a curing reaction, within a single molecule. As a result, the polyisocyanate curing agent may lower a storage modulus during the curing reaction, thereby relieving stress of an adhesive layer formed of the adhesive composition after the curing reaction.

The polyisocyanate curing agent may include a tri-isocyanate isocyanurate curing agent represented by the following Formula 1:

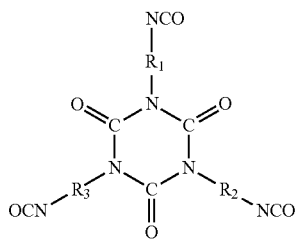

[Formula 1]

In Formula 1, $R_1$, $R_2$, and $R_3$ may each independently be a substituted or unsubstituted C1-C10 alkylene group, a substituted or unsubstituted C5-C10 cycloalkylene group, or a substituted or unsubstituted C6-C20 arylene group.

Substituents for the alkylene, cycloalkylene, or arylene groups may include, e.g., a C1-C5 alkyl group, a halogen group, or a C6-C10 aryl group.

Preferably, $R_1$, $R_2$ and $R_3$ are each independently a C1-C10 alkylene group.

More preferably, $R_1$, $R_2$ and $R_3$ are each independently a C5-C7 alkylene group.

The polyisocyanate curing agent may be prepared from an alkylene diisocyanate or may be provided from commercially available products. For example, the polyisocyanate curing agent may be an isocyanurate cyclic trimer of hexamethylene diisocyanate (HDI) (HDI trimer, DESMODUR N-3300, Bayer AG), etc.

The polyisocyanate curing agent may be present in an amount of about 0.01 to about 5.0 parts by weight based on 100 parts by weight of the (meth)acrylic copolymer in the adhesive composition for polarizer plates. Within this range, the adhesive layer may exhibit a low storage modulus, which may help prevent or reduce panel curling and light leakage while improving durability. The polyisocyanate curing agent is preferably present in an amount of about 0.1 to about 1 part by weight, more preferably about 0.1 to about 0.5 parts by weight.

In an implementation, the adhesive composition includes only the polyisocyanate curing agent as a curing agent. In another implementation, the adhesive composition may also include one or more other suitable curing agents (B2), such as may be generally applied to an adhesive composition for a polarizer plate. The other curing agent (B2) may be present in a smaller amount than the curing agent (B1).

The other curing agent (B2) may be selected from the group of isocyanate compounds, carbodiimide compounds, epoxy compounds, aziridine compounds, melamine compounds, amine compounds, imide compounds, and amide compounds, and mixtures thereof. Preferably, the curing agent is an isocyanate curing agent, more preferably, a non-isocyanurate isocyanate curing agent.

As used herein, the term "non-isocyanurate isocyanate curing agent" means an isocyanate curing agent that does not contain an isocyanurate structure.

A suitable isocyanate curing agent may be used. For example, the isocyanate curing agent may include at least one selected from the group of 2,4-trilenediisocyanate, 2,6-trilenediisocyanate, hydrogenated trilenediisocyanate, 1,3-xylene diisocyanate, 1,4-xylene diisocyanate, diphenylmethane-4,4-diisocyanate, 1,3-bis(isocyanatomethyl)cyclohexane, tetramethylxylene diisocyanate, 1,5-naphthalene diisocyanate, 2,2,4-trimethyl-hexamethylene diisocyanate, 2,4,4-trimethyl-hexamethylene diisocyanate, an adduct of trilene diisocyanate with trimethylolpropane, an adduct of xylene diisocyanate with trimethylolpropane, a toluene diisocyanate adduct of trimethylolpropane, triphenylmethane triisocyanate, and methylene bis(phenyl isocyanate).

The other curing agent (B2) may be present in an amount of about 0.001 to about 5 parts by weight based on 100 parts by weight of the (meth)acrylic copolymer in the adhesive composition for polarizer plates. Within this range, the adhesive layer may exhibit a low storage modulus, which may help prevent or reduce panel curling and light leakage, while improving durability. Preferably, the curing agent (B2) is present in an amount of about 0.01 to about 1 part by weight, more preferably about 0.01 to about 0.05 parts by weight.

When the adhesive composition includes both curing agents (B1) and (B2), the curing agents (B1) and (B2) may be present in a total amount of about 0.011 to about 2 parts by weight based on 100 parts by weight of the (meth)acrylic copolymer. Within this range, the adhesive composition may avoid deterioration in durability over time at high temperature and may have a suitable degree of cross-linking such that stress does not occur when the adhesive composition is applied to a protective film of a polarizer plate. Preferably, the total amount of curing agents (B1)+(B2) is about 0.1 to about 1.0 part by weight, more preferably from about 0.1 to about 0.6 parts by weight in the adhesive composition.

When the adhesive composition includes both curing agents (B1) and (B2), the weight ratio of the curing agent (B2) to the curing agent (B1) may range from about 0.01 to less than 1.0, preferably from about 0.05 to about 0.5, more preferably from about 0.06 to about 0.3.

As discussed above, the adhesive composition for polarizer plates may contain the (meth)acrylic copolymer. The (meth)acrylic copolymer may have a weight average molecular weight of about 800,000 to about 2,000,000 g/mol. Within this range, the adhesive composition may provide an adhesive layer exhibiting good durability. Preferably, the (meth)acrylic copolymer has a weight average molecular weight of about 800,000 to about 1,800,000 g/mol. The weight average molecular weight is obtained based on polystyrene conversion in GPC (Gel Permeation Chromatography).

The (meth)acrylic copolymer may be, e.g., a copolymer of a hydroxyl group-containing (meth)acrylic monomer and an alkyl group-containing (meth)acrylic monomer.

The hydroxyl group-containing (meth)acrylic monomer may be, e.g., a C2 to C20, preferably, C2 to C10 alkyl(meth) acrylic acid ester containing a hydroxyl group at a terminus or in the molecular structure. For example, the hydroxyl group-containing (meth)acrylic monomer may include at least one selected from the group of 2-hydroxyethyl(meth)acrylate, 2-hydroxypropyl(meth)acrylate, 2-hydroxybutyl(meth)acrylate, 4-hydroxybutyl(meth)acrylate, 6-hydroxyhexyl(meth)acrylate, 1,4-cyclohexanedimethanol mono(meth)acrylate, 1-chloro-2-hydroxypropyl(meth)acrylate, diethyleneglycol mono(meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, trimethylolethane di(meth)

acrylate, 2-hydroxy-3-phenyloxypropyl(meth)acrylate, 4-hydroxycyclopentyl(meth)acrylate, 4-hydroxycyclohexyl (meth)acrylate, and cyclohexane dimethanol mono(meth) acrylate, etc. The hydroxyl group-containing (meth)acrylic monomer may be present in an amount of about 0.01 to about 10 wt %, preferably about 0.01 to about 5 wt %, more preferably about 0.01 to about 1 wt %, in the (meth)acrylic copolymer. Within this range, bubbling or peeling may be avoided under heat and moisture conditions, and good reworkability and excellent durability may be obtained.

The alkyl group-containing (meth)acrylic monomer may include a (meth)acrylic acid ester containing a linear or branched C1 to C20 alkyl group. For example, the alkyl group-containing (meth)acrylic monomer may include at least one selected from the group of methyl(meth)acrylate, ethyl(meth)acrylate, propyl(meth)acrylate, n-butyl(meth) acrylate, tert-butyl(meth)acrylate, iso-butyl(meth)acrylate, pentyl(meth)acrylate, hexyl(meth)acrylate, 2-ethylhexyl (meth)acrylate, heptyl(meth)acrylate, octyl(meth)acrylate, iso-octyl(meth)acrylate, nonyl(meth)acrylate, decyl(meth) acrylate, and lauryl(meth)acrylate, etc. The alkyl group-containing (meth)acrylic monomer may be present in an amount of about 90 wt % to about 99.99 wt %, preferably about 95 wt % to about 99.99 wt %, more preferably about 99 wt % to about 99.99 wt %, in the (meth)acrylic copolymer. Within this range, it may be possible to better relieve stress.

In an embodiment, the (meth)acrylic copolymer may not include a carboxylic acid-containing monomer, in which case the (meth)acrylic copolymer may have an acid value of 0, which may help reduce or prevent oxidation of an adherend such as a transparent electrode film.

In an embodiment, the (meth)acrylic copolymer may not include an aromatic ring-containing monomer, in which case the (meth)acrylic copolymer may have 0 wt % of an aromatic ring structure.

The (meth)acrylic copolymer may be prepared by a suitable copolymer preparation process. For example, the (meth) acrylic copolymer may be prepared by adding a polymerization initiator into the mixture of monomers. The polymerization initiator may include at least one compound, e.g., two compounds, selected from the group of 2,2-azobis (2,4-dimethylvaleronitrile), azobisisobutyronitrile, benzoyl peroxide, dilauroyl peroxide, tert-butyl-(2-ethylhexyl) monoperoxycarbonate, tert-amyl-(2-ethylhexyl)monoperoxycarbonate, 1,1-di(tert-butylperoxy)cyclohexane, 1,1-di (tert-amylperoxy)cyclohexane, tert-butylperoxy-3,5,5-trimethylhexanoate, 1,1-di(tert-butylperoxy)-3,3,5-trimethylcyclohexane, potassium persulfate, sodium persulfate, ammonium persulfate, and azo-based water soluble initiators, etc. The initiator may be present in an amount of about 0.001 to about 2 parts by weight based on 100 parts by weight of the alkyl group-containing (meth) acrylic monomer.

The (meth)acrylic copolymer (A) may be prepared by a suitable method such as suspension polymerization, emulsion polymerization, etc. The temperature and time for polymerization may be suitably adjusted. For example, the (meth) acrylic copolymer (A) may be polymerized at a temperature of about 65° C. to about 70° C. for about 6 to about 8 hours.

The adhesive composition may further include a silane coupling agent. The silane coupling agent may be present in an amount of about 0.01 to about 5 parts by weight based on 100 parts by weight of the (meth)acrylic copolymer. Within this range, the adhesive composition may exhibit excellent adhesion with respect to a liquid crystal panel and good storage stability of the (meth)acrylic copolymer may be ensured. The silane coupling agent is preferably present in an amount of about 0.01 to about 1 part by weight, more preferably about 0.01 to about 0.1 parts by weight, based on 100 parts by weight of the (meth)acrylic copolymer.

A suitable silane coupling agent may be used. For example, the silane coupling agent may include at least one selected from the group of silicon compounds (silane compounds) having an epoxy structure, such as 3-glycidoxypropyltrimethoxysilane, 3-glycidoxypropylmethyldimethoxysilane, 2-(3,4-epoxycyclohexyl)ethyl trimethoxysilane, or the like; polymerizable unsaturated group-containing silicon compounds (silane compounds), such as vinyltrimethoxysilane, vinyltriethoxysilane, (meth)acryloxypropyltrimethoxysilane, or the like; amino group-containing silicon compounds (silane compounds), such as 3-aminopropyl trimethoxysilane, N-(2-aminoethyl)-3-aminopropyltrimethoxysilane, N-(2-aminoethyl)-3-aminopropylmethyldimethoxysilane, or the like; 3-chloropropyltrimethoxysilane, or the like, etc. Preferably, the silane coupling agent includes a silicon compound having an epoxy structure.

In an embodiment, the adhesive composition may further include a solvent. The solvent may be used to dissolve the (meth)acrylic copolymer and the curing agent. For example, the solvent may be methylethylketone or a mixture containing the same, etc.

In an embodiment, the adhesive composition may have a glass transition temperature of about −30° C. to about −55° C. Within this range, the adhesive composition may have flexibility, thereby improving durability.

In an embodiment, the adhesive composition may have a crosslinking density of about 60~90%. Within this range the adhesive composition may have good durability and may help prevent reliability deterioration such as separation or the like.

The adhesive composition may be used to provide an adhesive layer. The adhesive layer may be used to adhere a polarizer plate or a protective film to a panel of an optical display (e.g., a liquid crystal display). The adhesive layer may be used to adhere one protective film to another protective film in a polarizer plate that includes multiple protective films.

Another embodiment provides a polarizer plate that includes an adhesive layer formed of an adhesive composition according to an embodiment.

The polarizer plate may include a polarizer, a protective film or films stacked on one or both sides of the polarizer, and the adhesive layer formed on one side of the polarizer or protective film.

FIG. 1 illustrates an embodiment of the polarizer plate. As shown in FIG. 1, the polarizer plate may include a polarizer (1), a first and a second protective film (2,3) respectively adhered to both sides of the polarizer (1), and an adhesive layer (4) adhered to the second protective film (3) and to a panel of an optical display (not shown in FIG. 1). The adhesive layer (4) may be formed using an adhesive composition according to an embodiment.

Figure 2:
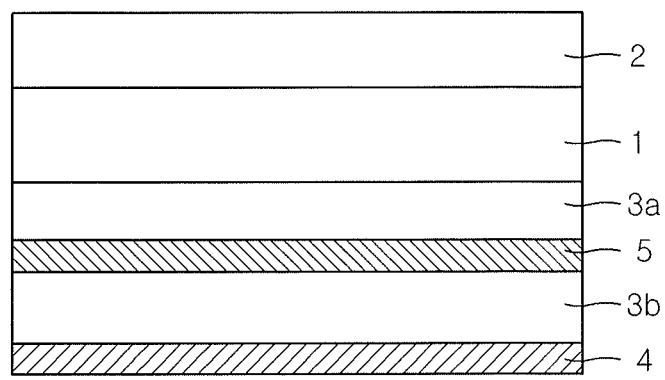
FIG. 2 illustrates another embodiment of the polarizer plate.

FIG. 2 shows another embodiment of the polarizer plate. As shown in FIG. 2, the polarizer plate may include a polarizer (1), a first and a second protective film (2,3a) respectively adhered to both sides of the polarizer (1), an adhesive layer (5) adhered the second protective film (3a) and to a third protective film (3b), and an adhesive layer (4) adhered to the third protective film (3b) and to a panel of an optical display (not shown in FIG. 2). The adhesive layers (4,5) may be formed using an adhesive composition according to an embodiment.

The adhesive layer may be formed by, e.g., coating and drying the adhesive composition on the polarizer or the protective film.

The adhesive layer may be cured by a suitable method. Curing of the adhesive layer may be carried out under conditions of about 35° C. and a relative humidity of about 45% for about 4 days, etc. After curing, the adhesive layer may have a thickness of about 10 μm to about 50 μm.

The cured adhesive layer may exhibit a great difference between a pushed distance (Y1) measured at 70° C. and a pushed distance (Y2) measured at 25° C., thereby preventing panel curling.

For a polarizer plate having a cured 20 μm thick adhesive layer formed thereon, a difference (Y1-Y2) between the pushed distance (Y1) measured at 70° C. and the pushed distance (Y2) measured at 25° C. may range from about 300 μm to about 1500 μm. In an embodiment, the difference (Y1-Y2) ranges from 300 μm to 1500 μm, which may help reduce or prevent panel curling by relieving stress on the adhesive layer caused by expansion and contraction of the polarizer plate even under high temperature or high humidity heat conditions in stacking the polarizer plate. Preferably, the difference (Y1-Y2) ranges from about 950 μm to about 1200 μm.

For measurement of the pushed distance (Y2) at 25° C., a polarizer plate was prepared by bonding protective films to both sides of a polarizer. Then, an adhesive composition for a polarizer plate according to an embodiment was coated and dried on one side of the protective film. The polarizer plate was left at 35° C. and a relative humidity of 45% for 4 days to cure the adhesive composition, thereby fabricating a polarizer plate having a cured 20 μm thick adhesive layer thereon. Then, the fabricated polarizer plate was cut into a 15 mm×15 mm piece, which in turn was attached to a glass substrate at 50° C. and 3.5 μm. The glass substrate was left at 25° C. for 1 day, thereby preparing a sample for measurement of the pushed distance. The sample was secured at upper and lower ends thereof to a tensile tester (Texture Analyzer) and subjected to a uniform load of 2250 gf at 25° C. for 1000 seconds, followed by measuring the pushed distance (Y2) of the adhesive layer.

For measurement of the pushed distance (Y1) at 70° C., a polarizer plate having a cured 20 μm thick adhesive layer formed thereon was prepared by the same process as described above. Then, the fabricated polarizer plate was cut into a 15 mm×15 mm piece, which in turn was attached to a glass substrate at 50° C. and 3.5 atm. The glass substrate was left at 25° C. for 1 day, thereby preparing a sample for measurement of the pushed distance. With a tensile tester (Texture Analyzer) maintained at 70° C., the sample was secured at upper and lower ends thereof to the tensile tester and subjected to a uniform load of 2250 gf at 70° C. for 1000 seconds, followed by measuring the pushed distance (Y1) of the adhesive layer.

The polarizer may be formed of, e.g., a polyvinyl alcohol film. For example, the polarizer may be formed of a partially formalized polyvinyl alcohol film, a modified polyvinyl alcohol film, such as an acetoacetyl-modified polyvinyl alcohol film, and the like.

The polyvinyl alcohol film preferably has a degree of polymerization of about 1,500 to about 4,000. Within this range, the polyvinyl alcohol film may be used as a polarization material and may provide satisfactory optical characteristics when used as a polarizing film.

The polarizer may be manufactured by dyeing the polyvinyl alcohol film with iodine or dichroic dyes, followed by stretching the dyed polyvinyl alcohol film in a certain direction. Specifically, the polarizer may be manufactured by swelling, dyeing, and stretching. The process for manufacturing the polarizer may be one typical in the art.

The polarizer may have a thickness of, e.g. about 15 μm to about 50 μm, etc.

The protective film may be formed of, e.g., cellulose, polyester, cyclic polyolefin, polycarbonate, polyethersulfone, polysulfone, polyamide, polyimide, polyolefin, polyarylate, polyvinyl alcohol, polyvinyl chloride, polyvinylidene chloride films, or a combination thereof. Preferably, the protective film is a cellulose film, more preferably triacetyl cellulose film.

The protective film may have a thickness of about 10 μm to about 200 μm, preferably about 30 μm to about 120 μm, etc.

Another embodiment provides an optical display, for example, a liquid crystal display, which includes the polarizer plate.

Specifically, in the liquid crystal display, the polarizer plate according to an embodiment may be used for one or both of a front polarizer plate (which is placed on a front side of the liquid crystal display panel) and a rear polarizer plate (which is placed on a rear side of the liquid crystal display panel, that is, between a backlight unit and the liquid crystal panel).

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparation Example

Preparation of Acrylic Copolymer 100 parts by weight of ethyl acetate, 1 part by weight of 4-hydroxybutyl acrylate (4HBA), 79 parts by weight of butyl acrylate (BA), and 20 parts by weight of methyl acrylate (MA) were placed in a 1 L four-neck flask, and heated to and maintained at 70° C. 0.02 parts by weight of azobisisobutyronitrile dissolved in 20 parts by weight of ethyl acetate was further added to the flask, followed by reaction at 65° C. for 5 hours, thereby preparing an acrylic copolymer (acid value: 0; content of aromatic ring: 0 wt %). The overall process was carried while supplying nitrogen to the flask at a flux of 10 cc/min.

Detailed specifications of the components for the following examples and comparative example were as follows.

(A) (Meth)acrylic copolymer: acrylic copolymer prepared in the preparation example (weight average molecular weight: $1.6 \times 10^6$ g/mol)

(B) Curing agents:

(B1) Tri-isocyanate isocyanurate (HDI trimer (isocyanurate trimer of hexamethylene diisocyanate (HDI)), DESMODUR N-3300, Bayer AG)

(B2) Toluene diisocyanate adduct of trimethylolpropane (AK-75, Aekyung Chemical Co., Ltd.).

(C) Silane coupling agent: 3-glycidoxypropyltrimethoxysilane (KBM-403, Shin-Etsu Chemical Co., Ltd.).

Example 1

100 parts by weight of the acrylic copolymer (A) and 0.1 parts by weight of the curing agent (B1) were added to 27 parts by weight of methylethylketone, followed by stirring at 25° C. for 5 minutes, preparing an adhesive composition for polarizer plates.

Example 2

100 parts by weight of the acrylic copolymer (A), 0.1 parts by weight of the curing agent (B1), and 0.03 parts by weight of the curing agent (B2) were added to 27 parts by weight of methylethylketone, followed by stirring at 25° C. for 5 minutes. Then, 0.06 parts by weight of the silane coupling agent (C) was added to the mixture, followed by stirring at 25° C. for 20 minutes, preparing an adhesive composition for polarizer plates.

Example 3

An adhesive composition for polarizer plates was prepared by the same method as in Example 2 except that 0.5 parts by weight of the curing agent (B1) was added.

Comparative Examples 1-2

Adhesive compositions for polarizer plates were prepared by the same methods as in Examples 1-2 except that the amounts of the curing agents (B1) and (B2) were changed as in Table 1.

TABLE 1

|     |      | Example 1 | Example 2 | Example 3 | Comparative Example 1 | Comparative Example 2 |
|-----|------|-----------|-----------|-----------|----------------------|----------------------|
| (A) |      | 100       | 100       | 100       | 100                  | 100                  |
| (B) | (B1) | 0.1       | 0.1       | 0.5       | —                    | —                    |
|     | (B2) | —         | 0.03      | 0.03      | 0.1                  | 0.03                 |
| (C) |      | —         | 0.06      | 0.06      | —                    | 0.06                 |

Experiment: Evaluation of Physical Properties of Adhesive Composition for Polarizer Plates The physical properties of the adhesive compositions prepared in the Examples and the Comparative Examples were evaluated, and the results are shown in Table 2.

Evaluation Method (1) Pushed distance (Y2) at 25° C.: The prepared adhesive composition was coated on one side of a triacetyl cellulose film of a polarizer plate (AMN-0244HC, Cheil Industries Inc.). The polarizer plate was left at 35° C. and a relative humidity of 45% for 4 days to cure the adhesive composition, thereby fabricating a polarizer plate having a cured 20 μm thick adhesive layer thereon.

The fabricated polarizer plate was cut into a 15 mm×15 mm piece, which in turn was attached to a glass substrate at 50° C. and 3.5 atm. The glass substrate was left at 25° C. for 1 day, thereby preparing a sample for measurement of the pushed distance. The sample was secured at upper and lower ends thereof to a tensile tester (Texture Analyzer) and subjected to a uniform load of 2250 gf at 25° C. for 1000 seconds, followed by measuring the pushed distance (Y2) of the adhesive layer.

(2) Pushed distance (Y1) at 70° C.: A polarizer plate having a cured 20 μm thick adhesive layer thereon was prepared as in (1). The fabricated polarizer plate was cut into a 15 mm×15 mm piece, which in turn was attached to a glass substrate at 50° C. and 3.5 atm. The glass substrate was left at 25° C. for 1 day, thereby preparing a sample for measurement of the pushed distance. An oven was provided to a tensile tester to maintain the tensile test at 70° C. the sample was secured at upper and lower ends thereof to the tensile tester and subjected to a uniform load of 2250 gf at 70° C. for 1000 seconds, followed by measuring the pushed distance (Y1) of the adhesive layer.

(3) Storage modulus (Pa): The prepared adhesive composition was deposited on a polyethylene terephthalate release film, followed by drying at 120° C. for 3 minutes to prepare a 20 μm thick adhesive layer. The prepared adhesive layer was attached in 5 folds to a sheet to prepare an adhesive sheet which has a 1 mm thick adhesive layer thereon. Then, the adhesive sheet was cut into a circular sample having a diameter of 8 mm. Storage modulus of the sample was measured using a storage modulus tester (MCR-501, Physica Co., Ltd.) through a frequency sweep test at 85° C. and a frequency of $10^{-3}$-$10^2$ rad/s.

(4) Panel curling: A polarizer plate having an adhesive layer was prepared as in (1) and attached to a liquid crystal cell using a laminator such that the adhesive layer of the polarizer plate adjoined the liquid crystal cell, thereby preparing a liquid crystal display panel (thickness: 500 μm, 0.5 T glass). The prepared panels were placed in an oven at 70° C., and removed from the oven after 24 hours, 96 hours, 250 hours, and 500 hours to measure the degree of panel curling. For this purpose, with the panel placed on a flat support, a weight of 1 kg was placed on one edge of the panel. A maximum distance between the ground and the panel at the opposite side was measured.

(5) Durability: A polarizer plate having an adhesive layer was prepared as in (1). The prepared polarizer plate was cut into a 10 cm×8 cm piece, which in turn was attached to a liquid crystal display or a glass substrate at 50° C. and 3.5 atm. The prepared samples were left under a dry heat condition at 85° C. for 250 hours, under a humid heat condition at a temperature of 60° C. and a relative humidity of 90% for 250 hours, and under a normal condition at 25° C. for 1 hour or more. Peeling of the adhesive layer at one end of the polarizer plate, and bubbling were evaluated. Evaluation standards were as follows.

□: No peeling and no bubbling
○: Slight peeling and partial bubbling
Δ: Slight peeling and severe bubbling
x: Severe peeling and severe bubbling (6) Glass transition temperature: The prepared adhesive composition was deposited on a polyethylene terephthalate release film, followed by drying at 120° C. for 3 minutes to prepare a 20 μm thick adhesive layer. Then, 10 mg of the adhesive layer was separated from the film, placed in an Al pan, and compressed by a press. While supplying nitrogen at a flux of 50 mL/min, analysis was performed at 40° C. using a Q100 (TA Instruments) after stabilization of DSC.

TABLE 2

|  | Example 1 | Example 2 | Example 3 | Comparative Example 1 | Comparative Example 2 |
|---|---|---|---|---|---|
| Pushed distance (Y2) at 25° C. (μm) | 430 | 420 | 450 | 150 | 350 |
| Pushed distance (Y1) at 70° C. (μm) | 1500 | 1400 | 1600 | 350 | 600 |
| Difference in pushed distance (Y1 − Y2) (μm) | 1070 | 980 | 1150 | 200 | 250 |
| Storage modulus (×$10^3$ Pa) | 22.9 | 27.4 | 25.6 | 37.6 | 28.5 |
| Panel curling (mm) | 0.17 | 0.19 | 0.15 | 0.53 | 0.26 |
| Durability | ○ | □ | □ | x | ○ |
| Glass | −48 | −40 | −40 | −48 | −48 |

TABLE 2-continued

|  | Example 1 | Example 2 | Example 3 | Comparative Example 1 | Comparative Example 2 |
|---|---|---|---|---|---|
| transition temperature (° C.) | | | | | |

As shown in Table 2, the adhesive compositions for polarizer plates according to the Examples had a high difference between the pushed distance measured at high temperature and the pushed distance measured at room temperature, and a low storage modulus, thereby realizing adhesive layers capable of reducing or preventing panel curling.

By way of summation and review, a process of manufacturing a liquid crystal display generally includes stacking polarizer plates on both sides of a liquid crystal cell. In this case, after an adhesive layer formed along one edge of the polarizer plate is attached to the liquid crystal cell, the entirety of the polarizer plate is attached to the liquid crystal cell using a laminator. Immediately after the polarizer plate is attached to the liquid crystal cell, the polarizer plate does not exhibit appearance variation. However, after exposure to high temperature or high humid heat conditions, the polarizer plate may contract whereas the adhesive layer may remain in an initial state and holds the polarizer plate, thereby causing panel curling. In this regard, hard type adhesives may introduce severe panel curling, causing light leakage of the liquid crystal display.

As described above, embodiments relate to an adhesive composition for a polarizer plate. The adhesive composition may provide an adhesive layer capable of preventing panel (e.g., a liquid crystal display panel) curling and light leakage while improving durability. Embodiments also relate to a polarizer plate including the adhesive layer, and an optical display including the same.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A polarizer plate comprising an adhesive layer formed from an adhesive composition, the adhesive composition comprising:
    a (meth)acrylic copolymer; and
    a polyisocyanate curing agent containing an isocyanurate structure,
    wherein the polyisocyanate curing agent is represented by Formula 1:

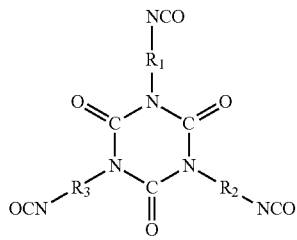

[Formula 1]

wherein $R_1$, $R_2$ and $R_3$ are each independently a substituted or unsubstituted C1-C10 alkylene group, a substituted or unsubstituted C5-C10 cycloalkylene group, or a substituted or unsubstituted C6-C20 arylene group,
wherein the polyisocyanate curing agent is present in an amount of 0.1 to 1 parts by weight based on 100 parts by weight of the (meth)acrylic copolymer,
wherein the (meth)acrylic copolymer is a copolymer of a hydroxyl group-containing (meth)acrylic monomer and an alkyl group-containing (meth)acrylic monomer, and
wherein a difference of Y1-Y2 ranges from about 300 μm to about 1500 μm, when Y1 represents a pushed distance of the adhesive layer measured at 70° C. by subjecting a sample to a load of 2250 gf for 1000 seconds, and Y2 represents a pushed distance of the adhesive layer measured at 25° C. by subjecting another sample to a load of 2250 gf for 1000 seconds, each of the samples being prepared by leaving the adhesive layer having a thickness of 20 μm at 35° C. and a relative humidity of 45% for 4 days to cure the adhesive layer, and cutting the cured adhesive layer into a 15 mm×15 mm piece, which in turn is attached to a glass substrate and left at 25° C. for 1 day.

2. The polarizer plate as claimed in claim 1, wherein the adhesive composition further includes a second curing agent selected from the group of a non-isocyanurate isocyanate compound, a carbodiimide compound, an epoxy compound, an aziridine compound, a melamine compound, an amine compound, an imide compound, an amide compound, and mixtures thereof.

3. The polarizer plate as claimed in claim 2, wherein the second curing agent is present in the adhesive composition in an amount of about 0.001 to about 5 parts by weight based on 100 parts by weight of the (meth)acrylic copolymer.

4. The polarizer plate as claimed in claim 2, wherein the polyisocyanate curing agent and the second curing agent are present in the adhesive composition in a total amount of about 0.011 to about 2 parts by weight based on 100 parts by weight of the (meth)acrylic copolymer.

5. The polarizer plate as claimed in claim 1, wherein the adhesive composition further includes a silane coupling agent.

6. The polarizer plate as claimed in claim 5, wherein the silane coupling agent is present in the adhesive composition in an amount of about 0.01 to about 5 parts by weight based on 100 parts by weight of the (meth)acrylic copolymer.

7. An optical display comprising the polarizer plate as claimed in claim 1.

8. The optical display as claimed in claim 1, wherein the polarizer plate has a panel curling of 0.15 mm to 0.19 mm.

* * * * *